United States Patent
Ramakrishnan et al.

(10) Patent No.: US 9,812,158 B1
(45) Date of Patent: Nov. 7, 2017

(54) BOND PAD SHARING FOR POWERING A MULTIPLICITY OF ELECTRICAL COMPONENTS OF A RECORDING HEAD

(71) Applicant: Seagate Technology LLC, Cupertino, CA (US)

(72) Inventors: Narayanan Ramakrishnan, Eden Prairie, MN (US); Declan Macken, Eden Prairie, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/370,985

(22) Filed: Dec. 6, 2016

Related U.S. Application Data (60) Provisional application No. 62/268,037, filed on Dec. 16, 2015.

(51) Int. Cl.
*G11B 5/48* (2006.01)
*G11B 5/00* (2006.01)

(52) U.S. Cl.
CPC .... *G11B 5/4853* (2013.01); *G11B 2005/0021* (2013.01)

(58) Field of Classification Search
CPC .............. G11B 5/02; G11B 2005/0005; G11B 2005/0021–2005/0024; G11B 5/48–5/4806; G11B 5/4846–5/486
USPC ................... 360/55, 75, 234.3–234.5, 244.1, 360/245.8–245.9
See application file for complete search history.

(56) References Cited

U.S. PATENT DOCUMENTS

| | | | |
|---|---|---|---|
| 4,914,398 A | 4/1990 | Jove et al. | |
| 5,298,641 A | 3/1994 | Stewen | |
| 5,494,473 A | 2/1996 | Dupuis et al. | |
| 5,527,110 A | 6/1996 | Abraham et al. | |
| 5,610,783 A | 3/1997 | Maffitt et al. | |
| 5,712,739 A * | 1/1998 | Nakamura ............ | G11B 5/012 360/46 |
| 5,712,747 A | 1/1998 | Voldman et al. | |
| 5,748,412 A | 5/1998 | Murdock et al. | |
| 5,768,068 A | 6/1998 | Eckberg et al. | |
| 5,850,374 A | 12/1998 | Abraham et al. | |
| 5,896,249 A | 4/1999 | Fontana, Jr. et al. | |
| 6,034,849 A | 3/2000 | Takizawa | |
| 6,052,249 A | 4/2000 | Abraham | |
| 6,347,983 B1 | 2/2002 | Hao et al. | |
| 6,396,667 B1 | 5/2002 | Zhang et al. | |

(Continued)

OTHER PUBLICATIONS

File History for U.S. Appl. No. 15/007,756.
U.S. Appl. No. 14/812,041, Macken et al.

*Primary Examiner* — Wayne Young
*Assistant Examiner* — James L Habermehl
(74) *Attorney, Agent, or Firm* — Hollingsworth Davis, LLC

(57) ABSTRACT

A slider of a magnetic recording head comprises a plurality of electrical bond pads coupled to bias sources and a ground pad. Each of a plurality of electrical components of the slider is coupled one or more of the electrical bond pads, wherein at least one of the electrical bond pads is a shared electrical bond pad coupled to at least a first electrical component and a second electrical component. A switching transistor is coupled to the first and second components and the ground pad. The switching transistor is arranged to control powering of the second component in response to biasing of the first component.

20 Claims, 9 Drawing Sheets

Writing

Reading

(56) References Cited

U.S. PATENT DOCUMENTS

| | | | |
|---|---|---|---|
| 6,623,330 B2 | 9/2003 | Fukuroi | |
| 6,813,118 B2 | 11/2004 | Pust et al. | |
| 7,088,543 B2 | 8/2006 | Satoh et al. | |
| 7,119,990 B2 | 10/2006 | Bajorek et al. | |
| 7,133,254 B2 | 11/2006 | Hamann et al. | |
| 7,239,470 B2 * | 7/2007 | Takahashi | G11B 5/6005 360/75 |
| 7,312,944 B2 * | 12/2007 | Takahashi | G11B 5/6005 360/75 |
| 7,362,534 B1 | 4/2008 | Schreck et al. | |
| 7,446,977 B2 | 11/2008 | Nikitin et al. | |
| 7,466,516 B2 | 12/2008 | Lille | |
| 7,551,406 B1 | 6/2009 | Thomas et al. | |
| 7,558,022 B2 * | 7/2009 | Kurita | G11B 5/6064 360/234.4 |
| 7,589,936 B1 | 9/2009 | McFadyen et al. | |
| 7,643,250 B2 | 1/2010 | Araki et al. | |
| 7,729,088 B2 * | 6/2010 | Kurita | G11B 5/6064 360/234.4 |
| 7,782,568 B2 | 8/2010 | Shiraki et al. | |
| 7,839,592 B2 * | 11/2010 | Hokuto | G11B 5/40 360/65 |
| 7,936,538 B1 | 5/2011 | Zhang et al. | |
| 7,969,687 B2 | 6/2011 | Lee et al. | |
| 8,098,450 B2 | 1/2012 | Baumgart et al. | |
| 8,159,780 B2 | 4/2012 | Brand | |
| 8,169,751 B2 | 5/2012 | Albrecht et al. | |
| 8,297,113 B2 | 10/2012 | Liners et al. | |
| 8,310,779 B2 | 11/2012 | Hanchi | |
| 8,400,736 B2 | 3/2013 | Greminger et al. | |
| 8,432,636 B2 * | 4/2013 | Brand | G11B 5/3133 360/125.02 |
| 8,804,276 B2 | 8/2014 | Johnson et al. | |
| 8,842,505 B2 * | 9/2014 | Yamada | G11B 5/4853 360/245.8 |
| 8,879,189 B2 | 11/2014 | Miyamoto et al. | |
| 8,937,791 B1 | 1/2015 | Olson et al. | |
| 8,947,807 B2 | 2/2015 | Heim et al. | |
| 8,953,275 B2 | 2/2015 | Chou et al. | |
| 8,988,803 B1 * | 3/2015 | Wilson | G11B 5/012 360/46 |
| 8,988,829 B1 * | 3/2015 | Contreras | G11B 5/486 360/234.5 |
| 9,047,926 B2 * | 6/2015 | Contreras | G11B 5/4866 |
| 9,202,498 B2 | 12/2015 | Macken | |
| 9,218,822 B1 * | 12/2015 | Contreras | G11B 5/486 |
| 9,607,640 B2 * | 3/2017 | Macken | G11B 5/4853 |
| 9,607,641 B1 * | 3/2017 | Ramakrishnan | G11B 5/6005 |
| 2005/0024775 A1 | 2/2005 | Kurita et al. | |
| 2005/0190495 A1 | 9/2005 | Lille | |
| 2006/0056110 A1 | 3/2006 | Kato et al. | |
| 2006/0203387 A1 | 9/2006 | White et al. | |
| 2007/0035881 A1 | 2/2007 | Burbank et al. | |
| 2007/0230056 A1 | 10/2007 | Beach et al. | |
| 2007/0274005 A1 | 11/2007 | Zhu et al. | |
| 2009/0040645 A1 | 2/2009 | Shimazawa et al. | |
| 2009/0052076 A1 | 2/2009 | Shimazawa et al. | |
| 2009/0052077 A1 | 2/2009 | Tanaka et al. | |
| 2009/0195930 A1 | 8/2009 | Lille | |
| 2009/0251821 A1 | 10/2009 | Song et al. | |
| 2009/0262460 A1 | 10/2009 | Hanchi | |
| 2010/0226044 A1 | 9/2010 | Iwase | |
| 2011/0013316 A1 | 1/2011 | Brand | |
| 2011/0019311 A1 | 1/2011 | Greminger et al. | |
| 2011/0248167 A1 | 10/2011 | Gurvitch et al. | |
| 2012/0113207 A1 | 5/2012 | Zheng | |
| 2012/0120519 A1 | 5/2012 | Kunkel et al. | |
| 2012/0120522 A1 | 5/2012 | Johnson et al. | |
| 2012/0120527 A1 | 5/2012 | Kunkel et al. | |
| 2012/0327529 A1 | 12/2012 | Hutchinson et al. | |
| 2013/0188273 A1 | 7/2013 | Miyamoto et al. | |
| 2014/0177083 A1 | 6/2014 | Heim et al. | |
| 2014/0269838 A1 | 9/2014 | Macken | |
| 2015/0103430 A1 | 4/2015 | Gadbois et al. | |

* cited by examiner

FIGURE 5A

Writing

FIGURE 5B

Reading

*FIGURE 6A*

Reading

*FIGURE 6B*

Writing

*FIGURE 7A*

Reading

*FIGURE 7B*

Writing

FIGURE 8A

Reading

FIGURE 8B

Writing

BOND PAD SHARING FOR POWERING A MULTIPLICITY OF ELECTRICAL COMPONENTS OF A RECORDING HEAD

RELATED PATENT DOCUMENTS

This application claims the benefit of Provisional Patent Application Ser. No. 62/268,037 filed on Dec. 16, 2015, to which priority is claimed pursuant to 35 U.S.C. §119(e), and which is incorporated herein by reference in its entirety.

SUMMARY

Various embodiments are directed to an apparatus which includes a slider of a magnetic recording head comprising a plurality of electrical bond pads coupled to bias sources and a ground pad. Each of a plurality of electrical components of the slider is coupled one or more of the electrical bond pads, wherein at least one of the electrical bond pads is a shared electrical bond pad coupled to at least a first electrical component and a second electrical component. A switching transistor is coupled to the first and second components and the ground pad. The switching transistor is arranged to control powering of the second component in response to biasing of the first component.

According to other embodiments, an apparatus comprises a slider of a magnetic recording head comprising a plurality of electrical bond pads coupled to bias sources and a ground pad. A switching transistor is provided at the slider. A first electrical component of the slider is coupled between a first bond pad and a shared bond pad. The first electrical component is coupled to a base of the switching transistor. A second electrical component of the slider is coupled between the shared bond pad and a collector of the switching transistor. An emitter of the switching transistor is coupled to the ground pad.

The above summary is not intended to describe each disclosed embodiment or every implementation of the present disclosure. The figures and the detailed description below more particularly exemplify illustrative embodiments.

DETAILED DESCRIPTION

Data storage systems commonly include one or more transducers that write and read information to and from a magnetic storage medium. A recording transducer, for example, incorporates several distinct electrical and, in some implementations, optical components that require specified voltages/currents to operate properly. Representative examples of such electrical transducer components include a reader, a reader heater, a writer, and a writer heater, among other possible components. Some recording transducers incorporate one or more sensors, such as contact sensors, each requiring specified operating voltages/currents. Each of the electrically activated components of a transducer is electrically coupled to corresponding electrical contacts or bond pads of the transducer. Depending on the particular design of a given transducer, various bond pads can be configured as voltage sources, current sources, and ground contacts, and can also send and receive signals (e.g., write signals, readback signals, sensor signals, control signals). Because bond pads take up appreciable space on a transducer and adding bond pads can be very expensive due to changes in design and fabrication processes needed to accommodate such additional bond pads, it is desirable to minimize both the number of bond pads and changes to the bond pad configuration of a transducer.

An issue with adding additional components or any electrical feature in general to an existing slider or HGA is the real estate required to place bond pads which allow access to these new features. Some slider form factors, for example, can accommodate nine bond pads. In other sliders, a total of ten bond pads is likely feasible. Any increase in bond pad count above nine or ten (depending on the slider/HGA design) likely requires migration to a top bond pad configuration, which is both more technically challenging and expensive. An alternative to adding an additional bond pad above the designed-in pad count is to share an existing bond pad between two or more electrical devices on the slider.

Sharing a common bond pad between two or more electrical components (e.g., readers) can raises the issue of bias contention as well as degraded performance (e.g., degraded common mode rejection). Such issues can be addressed by addition or modification of biasing and filtering circuitry, although this approach adds some degree of complexity to the design. An alternative and simpler approach involves pad sharing between electrical components having the same or similar biasing and/or filtering requirements. Another example of this approach involves a bond pad shared between electrical components that operate at different times or can be operated alternately.

One example of this approach involves a bond pad shared between a contact sensor (e.g., a thermal coefficient of resistance (TCR) contact sensor) and a reader heater or a writer heater. In some embodiments, for example, a contact sensor may not be required to be active at the same time as a reader heater or a writer heater, so there is little risk of contention on the shared bond pad. For example, a contact sensor situated at the close point of the reader may not be needed during writing operations. A contact sensor situated at the close point of the writer may not be needed during read operations. A TCR contact sensor and a typical heater (reader heater or writer heater), for example, are primarily resistive loads and have similar biasing and/or filtering requirements. Other examples of bond pad sharing between electrical components that operate at different times or can be operated alternately include circuitry comprising a reader and a writer heater. For example, a writer heater that thermally actuates a writer of the slider typically need not be active during read operations. A typical reader and a writer heater are primarily resistive loads and so the addition of an extra termination load on the other non-shared reader pad will mostly mitigate any impedance mismatch on the two reader traces back to the pre-amplifier, thus minimizing the impact of common mode noise.

Figure 1:
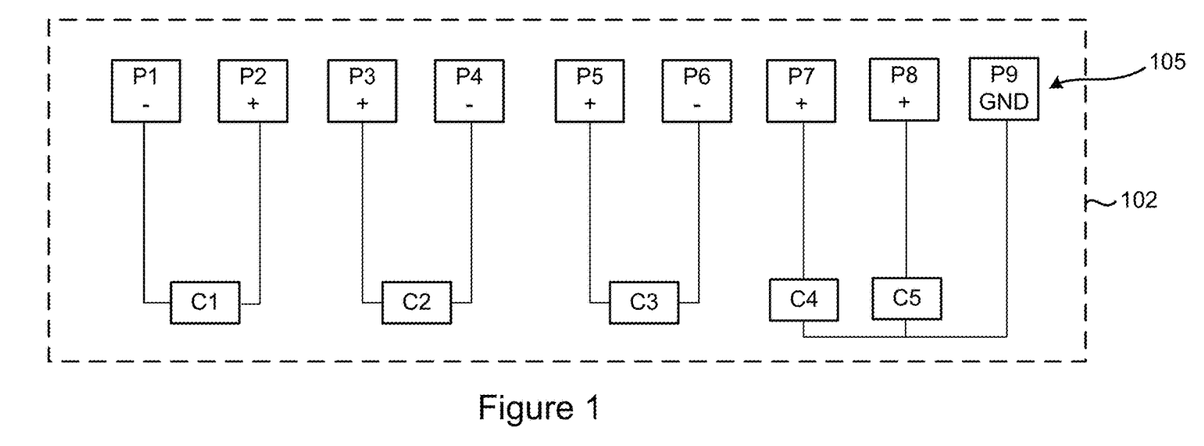
FIG. 1 illustrates an embodiment of a recording transducer that does not utilize pad sharing.
Figure 2:
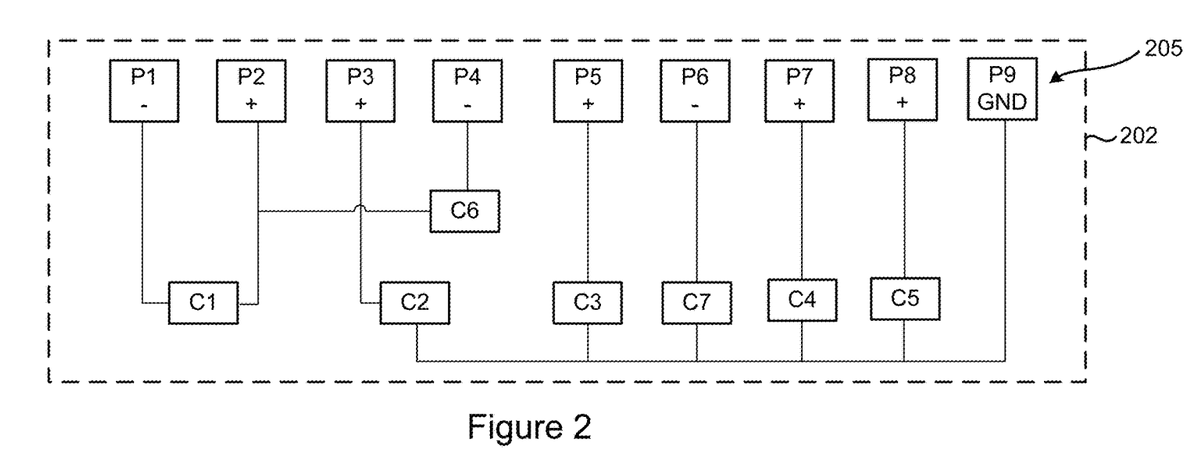
FIG. 2 illustrates a recording transducer that utilizes pad sharing according to embodiments of the present disclosure.

FIG. 1 illustrates an embodiment of a recording transducer that does not utilize pad sharing according to the present disclosure. FIG. 2 illustrates a recording transducer that utilizes pad sharing according to embodiments of the present disclosure. The bond pad layout shown in FIG. 1 is the same as that shown in FIG. 2, and the electrical components identified as C1-C5 in FIG. 1 are the same as those shown as components C1-C5 in FIG. 2 for purposes of illustration. It is understood that the bond pad layout, components, and wiring configuration shown in FIGS. 1 and 2 are provided for non-limiting illustrative purposes.

FIG. 1 illustrates a slider 102 that supports a recording transducer comprising a multiplicity of electrical components (C1-C5) coupled to a set 105 of bond pads (P1-P9). The set 105 of bond pads includes eight electrical bond pads (P1-P8) and one ground pad (P9, also referred to herein simply as ground). The term "electrical bond pad" refers to a bond pad that is coupled to a bias source, such as a voltage or current source (AC or DC), that provides power for an electrical component. The slider 102 shown in FIG. 1 utilizes eight electrical bond pads (P1-P8) to power five electrical components (C1-C5).

Electrical components C1-C3 can be referred to as dual-ended components, since each is coupled between a pair of electrical bond pads (e.g., one end of C1 is connected to negative pad P1 and the other end of C1 is connected to positive pad P2). Each dual-ended component requires two electrical bond pads for proper operation. Electrical components C4 and C5 can be referred to as single-ended components, since each is coupled between a single electrical bond pad and ground (e.g., one end of C5 is connected to positive pad P8 and the other end of C5 is connected to ground pad P9). Each single-ended component requires one electrical bond pad for proper operation. It is noted that the polarity of the electrical bond pads can change during operation, such that a given pad can be at a positive potential during one operating state and at a negative potential during another operating state.

FIG. 2 shows an apparatus according to various embodiments that includes a slider 202 comprising a plurality of electrical bond pads coupled to bias sources 205. The slider 202 further comprises a plurality of electrical components each coupled to at least one of the electrical bond pads. At least one of the electrical bond pads is shared between a plurality of the electrical components. According to some embodiments, the slider 202 supports a recording transducer comprising a multiplicity of electrical components (C1-C7) coupled to a set 205 of bond pads (P1-P9). As previously discussed, the set 205 of bond pads is the same as the bond pad set 205 shown in FIG. 1 (i.e., 8 electrical bond pads and 1 ground pad). In contrast to the slider 205 illustrated in FIG. 1 which supports five electrical components using eight electrical bond pads, the slider 205 shown in FIG. 2 supports seven electrical components while using the same number (i.e., 8) of electrical bond pads.

In FIG. 2, electrical bond pad P2 is shared between electrical components C1 and C6, thereby freeing up one electrical bond pad for other use or elimination. The electrical component C2 in FIG. 2, which performs the same function as C2 in FIG. 1, is implemented as a single-ended component, thereby freeing up one electrical bond pad for other use or elimination. By freeing up two electrical bond pads in the illustrative slider 202 shown in FIG. 2, two additional components (C6 and C7) have been added to the slider 202 as compared to the implementation illustrated in FIG. 1.

The need for sharing of electrical bond pads has intensified in the advent of recording heads configured for heat-assisted magnetic recording (HAMR), also referred to as energy-assisted magnetic recording (EAMR), thermally-assisted magnetic recording (TAMR), and thermally-assisted recording (TAR). In addition to convention components, A HAMR head incorporates various optical components and sensors that require power supplied by the set of bond pads made available at the transducer. The increase in the number and type of components and sensors of a HAMR head significantly complicates the electrical bond pad connection and powering strategy for a particular HAMR head design.

Figure 3:
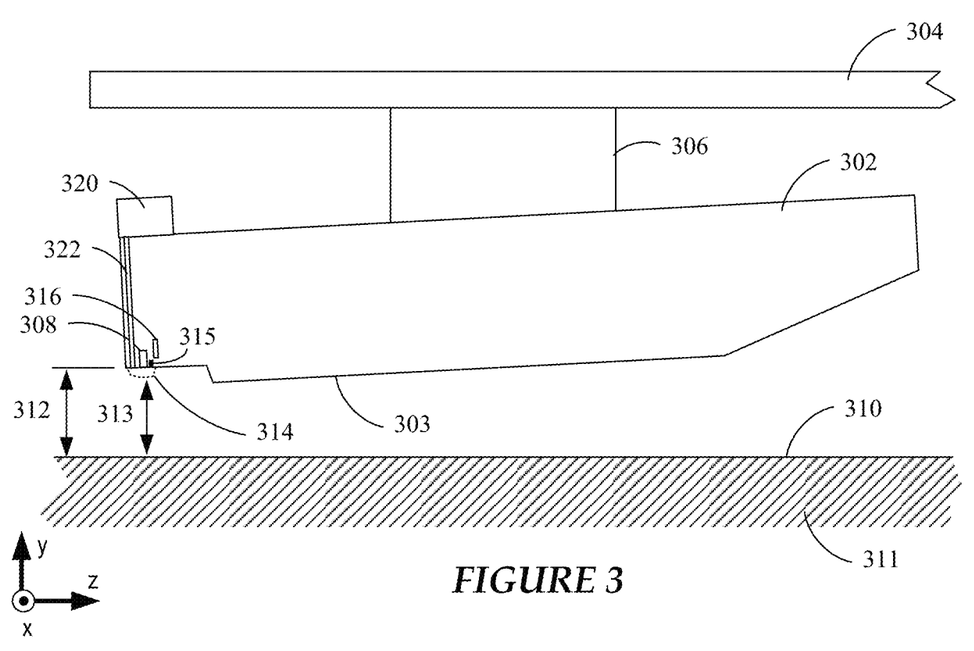
FIG. 3 shows a side view of a read/write transducer configured for heat-assisted magnetic recording according to a representative embodiment.

FIG. 3 shows a side view of a read/write transducer 302 configured for heat-assisted magnetic recording according to a representative embodiment. The read/write transducer 302 may be used in a magnetic data storage device, e.g., a hard disk drive. The read/write transducer 302 may also be referred to herein as a slider, read head, recording head, etc. The read/write transducer 302 is coupled to an arm 304 by way of a suspension 306 that allows some relative motion between the read/write transducer 302 and arm 304. The read/write transducer 302 includes read/write transducers 308 at a trailing edge that are held proximate to a surface 310 of a magnetic recording medium 311, e.g., magnetic disk. The read/write transducer 302 further includes a laser 320 and a waveguide 322. The waveguide 322 delivers light from the laser 320 to components (e.g., a near-field transducer) near the read/write transducers 308.

When the read/write transducer 302 is located over surface 310 of recording medium 311, a flying height 312 is maintained between the read/write transducer 302 and the surface 310 by a downward force of arm 304. This downward force is counterbalanced by an air cushion that exists between the surface 310 and an air bearing surface 303 (also referred to herein as a "media-facing surface") of the read/write transducer 302 when the recording medium 311 is rotating. It is desirable to maintain a predetermined slider flying height 312 over a range of disk rotational speeds during both reading and writing operations to ensure consistent performance. Region 314 is a "close point" of the read/write transducer 302, which is generally understood to be the closest spacing between the read/write transducers 308 and the magnetic recording medium 311, and generally defines the head-to-medium spacing 313.

To account for both static and dynamic variations that may affect slider flying height 312, the read/write transducer 302 may be configured such that a region 314 of the read/write transducer 302 can be configurably adjusted during operation in order to finely adjust the head-to-medium spacing 313. This is shown in FIG. 3 by a dotted line that represents a change in geometry of the region 314. In this example, the geometry change may be induced, in whole or in part, by an increase or decrease in temperature of the region 314 via a heater 316. A thermal sensor 315 is shown situated at or near the close point 314 (e.g., adjacent the read/write transducers 308, such as near the near-field transducer) or can be positioned at other location of the ABS 303.

Figure 4:
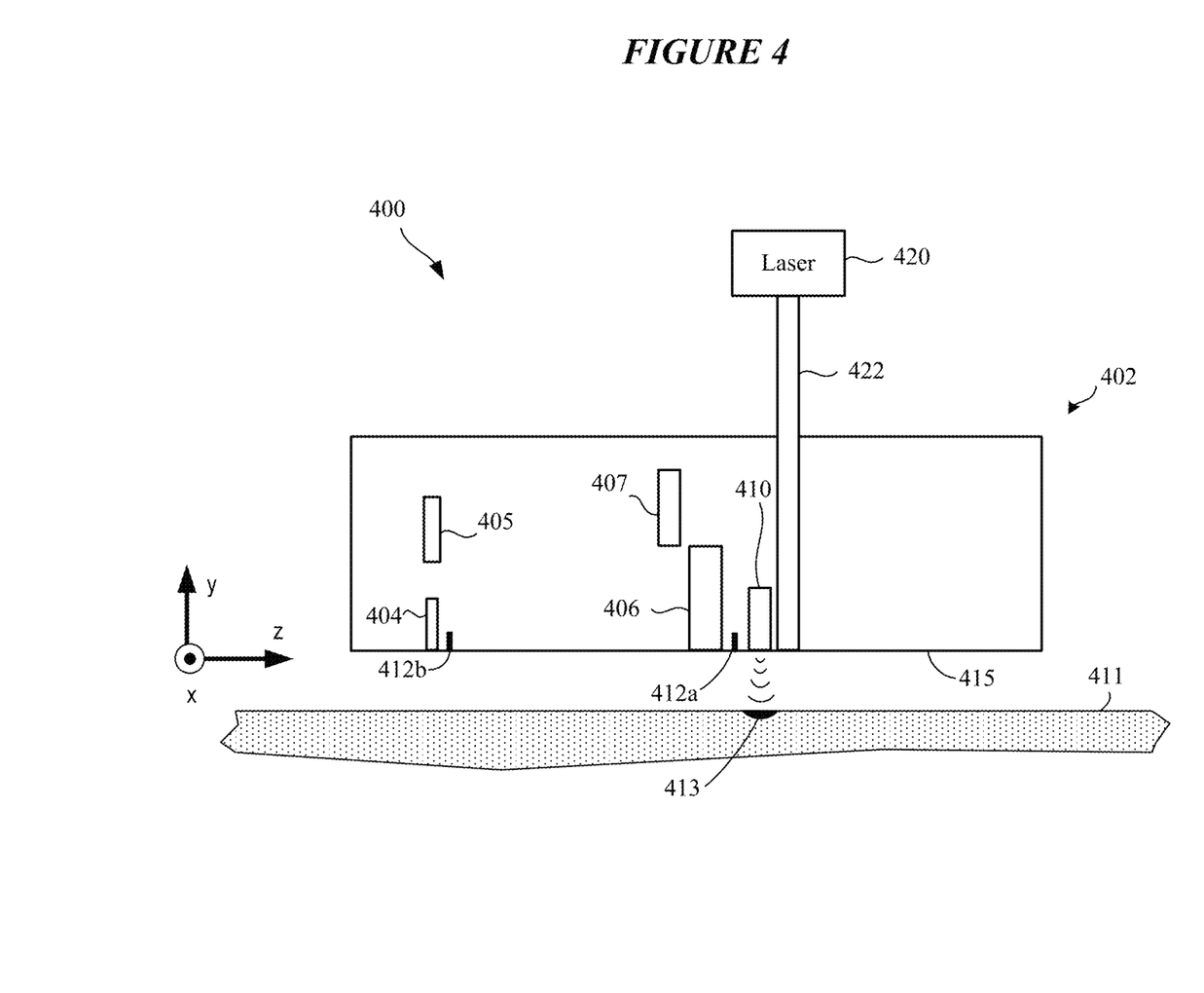
FIG. 4 shows a HAMR head arrangement in accordance with various embodiments.

FIG. 4 shows a HAMR head arrangement 400 in accordance with various embodiments. The recording head arrangement 400 includes a slider 402 positioned proximate a rotating magnetic medium 411. The slider 402 includes a reader 404 and a writer 406 proximate the ABS 415 for respectively reading and writing data from/to the magnetic medium 411. The writer 406 is located adjacent a near-field transducer (NFT) 410 which is optically coupled to a light source 420 (e.g., laser diode) via a waveguide 422. The light source 420 can be mounted external, or integral, to the slider 402. The light source 420 energizes the NFT 410 via the waveguide 422. The writer 406 includes a corresponding heater 407, and the reader 404 includes a corresponding heater 405 according to various embodiments. The writer heater 407 can be powered to cause protrusion of the ABS 415 predominately in the ABS region at or proximate the writer 406, and the reader heater 405 can be powered to cause protrusion of the ABS 415 predominately in the ABS region at or proximate the reader 404. Power can be controllably delivered independently to the heaters 407 and 405 to adjust the fly height (e.g., clearance) of the slider 402 relative to the surface of the recording medium 411. One or more thermal sensors 412a, 412b can be situated at various locations on the slider 402 at or near the ABS 415 for purposes of monitoring temperature, head-medium spacing changes, and head-medium contact.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hot spot 413 over the track of the magnetic medium 411 where writing takes place, as shown in FIG. 4. The light from the source 420 propagates to the NFT 410, e.g., either directly from the source 420 or through the mode converter or by way of a focusing element. Other optical elements, such as couplers, mirrors, prisms, etc., may also be formed integral to the slider.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 413 is on the order of 50 nm or less. Thus, the desired hot spot size is well below half the wavelength of the light. Optical focusers cannot be used to obtain the desired hot spot size, being diffraction limited at this scale. As a result, the NFT 410 is employed to create a hot spot on the media.

The NFT 410 is a near-field optics device configured to generate local surface plasmon resonance at a designated (e.g., design) wavelength. The NFT 410 is generally formed from a thin film of plasmonic material (e.g., gold, silver, copper) on a substrate. In a HAMR slider 402, the NFT 410 is positioned proximate the write pole of the writer 406. The NFT 410 is aligned with the plane of the ABS 415 parallel to the read/write surface of the magnetic medium 411. The NFT 410 achieves surface plasmon resonance in response to the incident electromagnetic energy. The plasmons generated by this resonance are emitted from the NFT 410 towards the magnetic medium 411 where they are absorbed to create the hot spot 413. At resonance, a high electric field surrounds the NFT 410 due to the collective oscillations of electrons at the metal surface (e.g., substrate) of the magnetic medium 411. At least a portion of the electric field surrounding the NFT 410 gets absorbed by the magnetic medium 411, thereby raising the temperature of the spot 413 on the medium 411 as data is being recorded.

Various embodiments of bond pad sharing by a multiplicity of transducer components will now be described in greater detail. In general, embodiments of the disclosure incorporate a switching transistor into bond pad sharing circuitry to control which and when a particular component is energized, thereby allowing multiple components sharing a bond pad to operate independently. Some of the embodiments described below are directed to an apparatus comprising a slider of a recording head which includes a plurality of electrical bond pads coupled to bias sources and a ground pad. Each of a plurality of electrical components of the slider is coupled to at least one of the electrical bond pads. At least one of the electrical bond pads is a shared electrical bond pad coupled to at least a first electrical component and a second electrical component. A switching transistor is coupled to the first and second components and the ground pad. The switching transistor facilitates selective powering of the first and second electrical components. For example, the switching transistor can be arranged to control powering of the second component in response to biasing of the first component. In some modes, the switching transistor facilitates alternate powering of the first and second components. In other modes, the switching transistor facilitates concurrent powering of the first and second components.

According to some embodiments, a slider of a magnetic recording head includes a multiplicity of electrical bond pads coupled to bias sources and a ground pad. A switching transistor is provided at the slider. A first electrical component of the slider is coupled between a first bond pad and a shared bond pad. The first electrical component is coupled to a base of the switching transistor. A second electrical component of the slider is coupled between the shared bond pad and a collector of the switching transistor. An emitter of the switching transistor is coupled to the ground pad. In some modes, the switching transistor facilitates alternate powering of the first and second components. In other modes, the switching transistor facilitates concurrent powering of the first and second components.

Figure 5A:
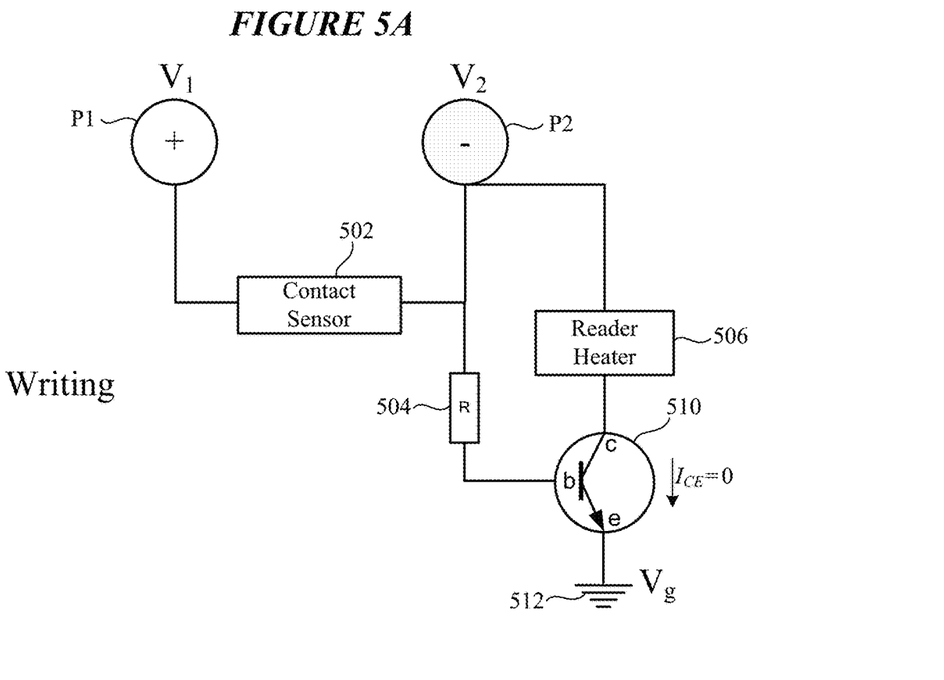
FIGS. 5A and 5B illustrate circuits that support bond pad sharing between a multiplicity of components in accordance with various embodiments.
Figure 5B:
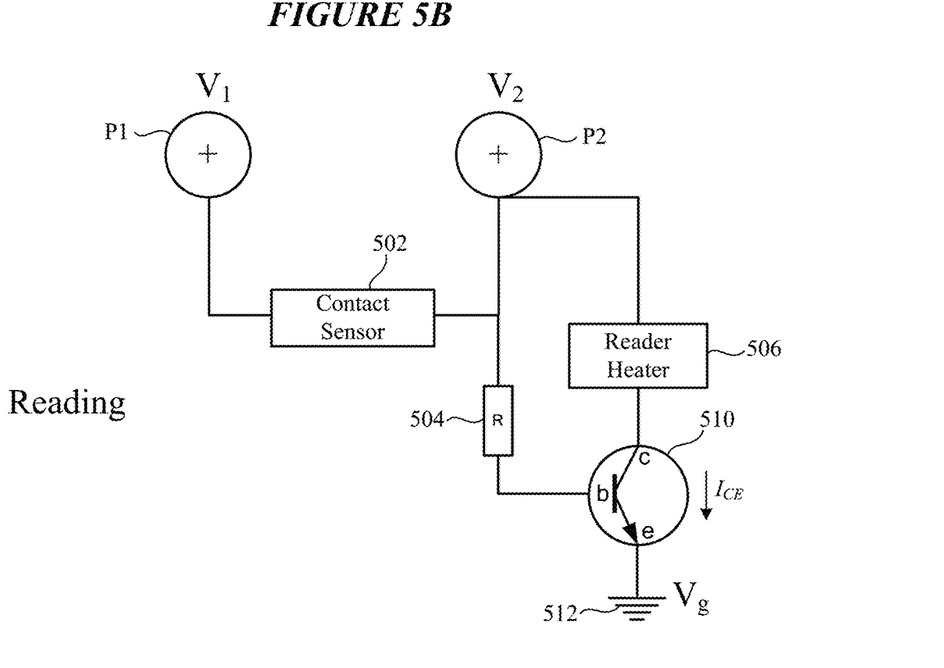

FIGS. 5A and 5B illustrate circuits that support bond pad sharing between a multiplicity of electrical components of a slider in accordance with various embodiments. In particular, FIGS. 5A and 5B illustrate circuitry configured to facilitate bond pad sharing between a contact sensor 502 and a reader heater 506 in accordance with various embodiments. The contact sensor 502 is configured to sense head-medium contact. In some embodiments, the contact sensor 502 is configured to sense thermal asperities. In other embodiments, the contact sensor 502 is configured to sense head-medium contact and thermal asperities. The reader heater 506 is typically used to thermally actuate the reader of the slider during read operations, and can also be activated when setting clearance of the slider.

In FIGS. 5A and 5B, two bond pads, P1 and P2, are shown for illustrative purposes. Bond pads P1 and P2 can be biased in a number of ways, such as by alternating the polarity of the voltages supplied to bond pads P1 and P2 or supplying voltages to bond pads P1 and P2 of the same polarity (which may be the same or different in magnitude). In the embodiment shown in FIG. 5A, the contact sensor 502 is coupled between bond pads P1 and P2. The contact sensor 502 can be implemented as a thermal sensor, such as a resistive temperature sensor (e.g., TCR sensor), for example. In some embodiments, the contact sensor 502 is implemented as a DETCR (dual-ended TCR sensor). The contact sensor 502 can be implemented using other technologies, such as a thermocouple or a thermistor. The contact sensor 502 is typically situated at the air bearing surface of the slider, such as at a close point of the writer.

The circuitry shown in FIGS. 5A and 5B further includes a reader heater 506, which is situated near the reader of the slider and configured to thermally actuate the reader. The reader heater 506 is typically a resistive load, such as a metal wire. The reader heater 506 is coupled between bond pad P2 and a switching transistor 510. Because the reader heater 506 and the contact sensor 502 are both coupled to bond pad P2, bond pad P2 is considered a shared bond pad.

In the embodiment shown in FIGS. 5A and 5B, the switching transistor 510 is configured as an NPN bipolar junction transistor (BJT). More particularly, the switching transistor 510 is implemented in the circuitry of FIGS. 5A and 5B according to a common emitter (or grounded emitter) configuration. It is understood that the particular BJT configuration shown in the figures is for illustrative purposes, and that other switching transistor configurations with supporting circuitry are contemplated. For example, a PNP switching transistor (with appropriate circuitry and biasing) can be implemented instead of an NPN switching transistor. Other transistor configurations are contemplated, such as common base and common collector configurations. Alternatively, field-effect transistors (FET), either of the junction-FET type (JFET) or MOS-FET kind, can be employed. These FETs may be more amenable (more compatible with standard wafer processes) for on-wafer fabrication such as in the form of GaAs or AlGaN—GaN heterojunction FETs.

In the embodiment shown in FIGS. 5A and 5B, the collector (c) of the switching transistor 510 is coupled to bond pad P2 via the reader heater 506. The base (b) of the switching transistor 510 is coupled to the contact sensor 502 and bond pad P2 via a resistor, R. The emitter (e) of the switching transistor 510 is coupled to ground, such as ground pad 512. The grounded emitter configuration of the switching transistor 510 ensures unidirectional flow of current through the reader heater 506. The grounded emitter configuration of the switching transistor 510 also provides excellent ground noise immunity. Because the transistor 510 is configured for switching rather than amplification, switching transistor 510 is configured to operate in the saturation region and the cut-off region. In the saturation region, the switching transistor 510 is fully ON, operating as a switch with $I_C = I_{saturation}$. In the cut-off region, the switching transistor 510 is fully OFF, operating as a switch with $I_C = 0$. The value of resistor 504 is appropriately chosen so that the switching transistor 510 sets the threshold base current suitably to turn the switching transistor 510 ON in the desired mode of operation (e.g., read mode or write mode) while keeping the threshold current high enough to keep the switching transistor 510 in the OFF state in the other mode.

FIG. 5A shows the circuitry biased for operation during a write mode. In a write mode, the contact sensor 502 (e.g., situated at a writer close point) is energized (active) and the reader heater 506 is de-energized (inactive). FIG. 5B shows the circuitry biased for operation during a read mode. In a read mode, the contact sensor 502 is de-energized (inactive) and the reader heater 506 is energized (active).

In the write mode configuration shown in FIG. 5A, the voltage $V_1$ of bond pad P1 is greater than the voltage $V_2$ of shared bond pad P2. As illustrated, the voltage $V_1$ is a positive voltage, and the voltage $V_2$ is a negative voltage. It is noted that the voltage $V_2$ of shared bond pad P2 is less than the voltage $V_G$ at the ground pad 512. Given the polarities of the voltages $V_1$ (+) and $V_2$ (−) shown in FIG. 5A, the contact sensor 502 is energized, such that current flows through the contact sensor 502. Because the voltage $V_2$ of shared bond pad P2 is negative, a negative voltage appears at the base (b) of the switching transistor 510. As such, the requisite threshold base current is not supplied to the base (b), thereby keeping the switching transistor 510 in the OFF state ($I_{CE}=0$). Accordingly, no current flows through the reader heater 506, which is not needed during the write mode, and remains inactive while the contact sensor 502 remains active.

In the read mode configuration shown in FIG. 5B, the voltage $V_1$ of bond pad P1 is equal to the voltage $V_2$ of shared bond pad P2. As illustrated, the voltages $V_1$ and $V_2$ are positive voltages. It is noted that the voltage $V_2$ of shared bond pad P2 is greater than the voltage $V_G$ at the ground pad 512. Because the voltages $V_1$ (+) and $V_2$ (+) shown in FIG. 5B are the same, the contact sensor 502 is de-energized, such that no current flows through the contact sensor 502. Because the voltage $V_2$ of shared bond pad P2 is positive, a positive voltage appears at the base (b) of the switching transistor 510, and the requisite threshold base current is supplied to the base (b). In response, the switching transistor 510 switches from the OFF state (shown in FIG. 5A) to the ON state ($I_{CE}$, with $I_C$ at $I_{saturation}$). Accordingly, current flows through the reader heater 506, which is needed during the read mode, and remains active while the contact sensor 502 remains inactive.

If the contact sensor 502 is needed during reading, the voltage $V_1$ of bond pad P1 can be reduced (e.g., made negative) relative to the voltage $V_2$ of the shared bond pad P2. The voltage drop across the contact sensor 502 results in current flow through the contact sensor 502 in a direction opposite that in FIG. 5A. In this configuration, the contact sensor 502 and the reader heater 506 are concurrently energized and active.

In some embodiments, the switching transistor 510 can be formed in-situ the slider during slider fabrication. For example, the switching transistor 510 can be formed on a substrate of the slider prior to formation of the reader and the writer. In other embodiments, the switching transistor 510 can be formed on a substrate (wafer) separate from the slider, which simplifies slider fabrication. After forming the switching transistor 510 on a separate substrate, a pick-and-place process can be used to position the switching transistor 510 on the slider at the appropriate location during slider fabrication.

Figure 6A:
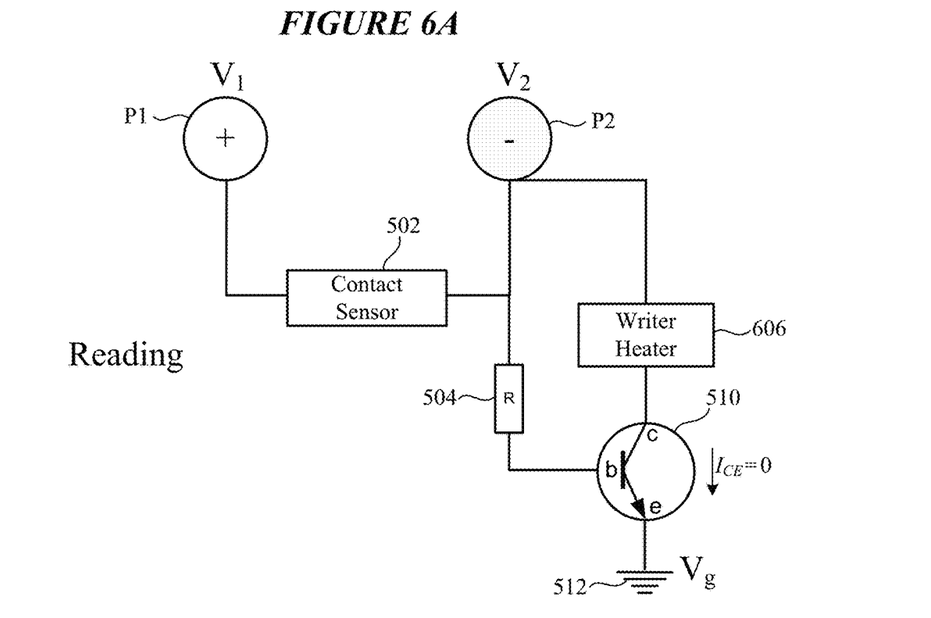
FIGS. 6A and 6B illustrate circuits that support bond pad sharing between a multiplicity of components in accordance with various embodiments.
Figure 6B:
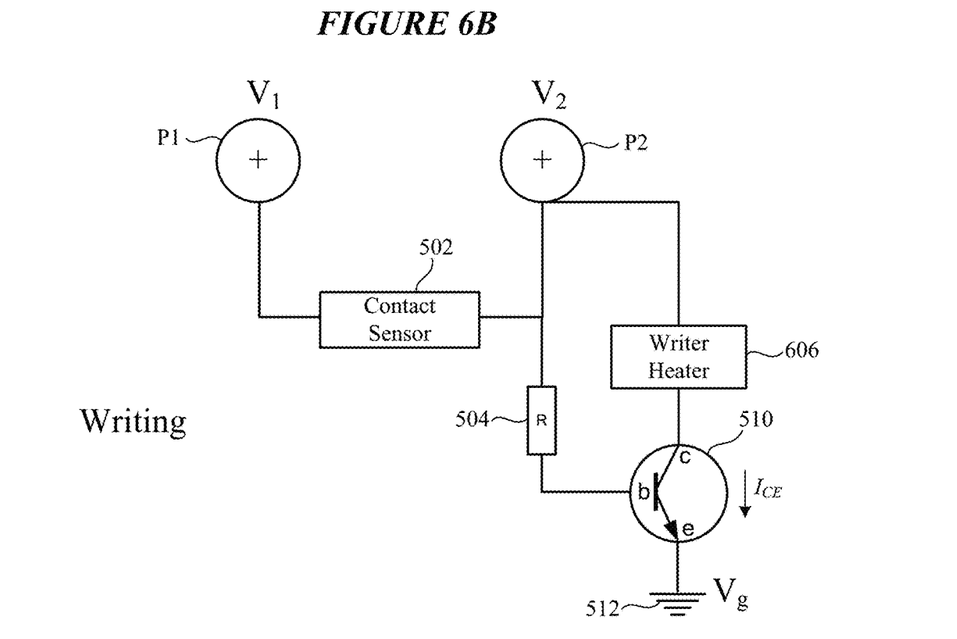

FIGS. 6A and 6B illustrate circuits that support bond pad sharing between a multiplicity of electrical components of a slider in accordance with various embodiments. In particular, FIGS. 6A and 6B illustrate circuitry configured to facilitate bond pad sharing between a contact sensor 502 and a writer heater 606 in accordance with various embodiments. The contact sensor 502 is configured to sense one or both of head-medium contact and thermal asperities. The contact sensor 502 shown in FIGS. 6A and 6B can be situated at a reader close point. The writer heater 606 is typically used to thermally actuate the writer of the slider during write operations, and can also be activated when setting clearance of the slider.

In FIGS. 6A and 6B, two bond pads, P1 and P2, are shown for illustrative purposes. Bond pads P1 and P2 can be biased in a number of ways, such as by alternating the polarity of the voltages supplied to bond pads P1 and P2 or supplying voltages to bond pads P1 and P2 of the same polarity (which may be the same or different in magnitude). In the embodiment shown in FIG. 6A, the contact sensor 502 is coupled between bond pads P1 and P2. The contact sensor 502 can be implemented as a thermal sensor of a type previously described. FIG. 6A shows the circuitry biased for operation during a read mode. In a read mode, the contact sensor 502 is energized (active) and the writer heater 606 is de-energized (inactive). FIG. 6B shows the circuitry biased for operation during a write mode. In a write mode, the contact sensor 502 is de-energized (inactive) and the writer heater 606 is energized (active).

In the read mode configuration shown in FIG. 6A, the voltage $V_1$ (+) of bond pad P1 is greater than the voltage $V_2$ (−) of shared bond pad P2. It is noted that the voltage $V_2$ of shared bond pad P2 is less than the voltage $V_G$ at the ground pad 512. Given the polarities of the voltages $V_1$ (+) and $V_2$ (−) shown in FIG. 6A, the contact sensor 502 is energized, such that current flows through the contact sensor 502. Because the voltage $V_2$ of shared bond pad P2 is negative, a negative voltage appears at the base (b) of the switching transistor 510, thereby keeping the switching transistor 510 in the OFF state ($I_{CE}$=0). As such, no current flows through the writer heater 606, which is not needed during the read mode, and remains inactive while the contact sensor 502 remains active.

In the write mode configuration shown in FIG. 6B, the voltage $V_1$ (+) of bond pad P1 is equal to the voltage $V_2$ (+) of shared bond pad P2. It is noted that the voltage $V_2$ of shared bond pad P2 is greater than the voltage $V_G$ at the ground pad 512. Because the voltages $V_1$ (+) and $V_2$ (+) shown in FIG. 6B are the same, the contact sensor 502 is de-energized, such that no current flows through the contact sensor 502. Because the voltage $V_2$ of shared bond pad P2 is positive, a positive voltage appears at the base (b) of the switching transistor 510, causing the switching transistor 510 to switch from the OFF state (shown in FIG. 6A) to the ON state. Accordingly, current flows through the writer heater 606, which is needed during the write mode, and remains active while the contact sensor 502 remains inactive. If the contact sensor 502 is needed during writing, the voltage $V_1$ of bond pad P1 can be reduced (e.g., made negative) relative to the voltage $V_2$ of the shared bond pad P2. The voltage drop across the contact sensor 502 results in current flow through the contact sensor 502 in a direction opposite that in FIG. 6A. In this configuration, the contact sensor 502 and the writer heater 606 are concurrently energized and active.

Figure 7A:
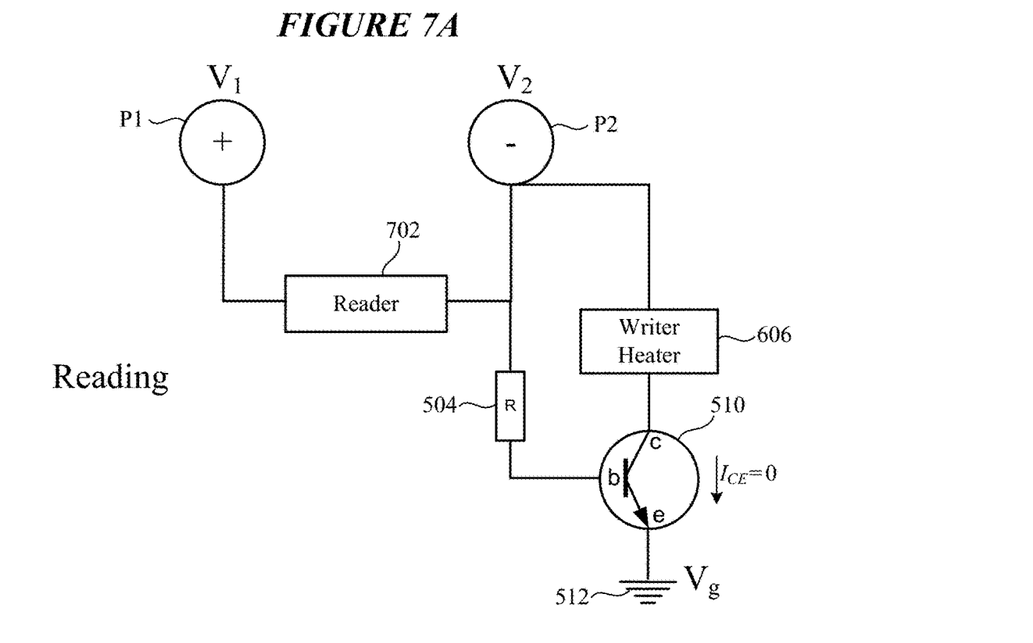
FIGS. 7A and 7B illustrate circuits that support bond pad sharing between a multiplicity of components in accordance with various embodiments.
Figure 7B:
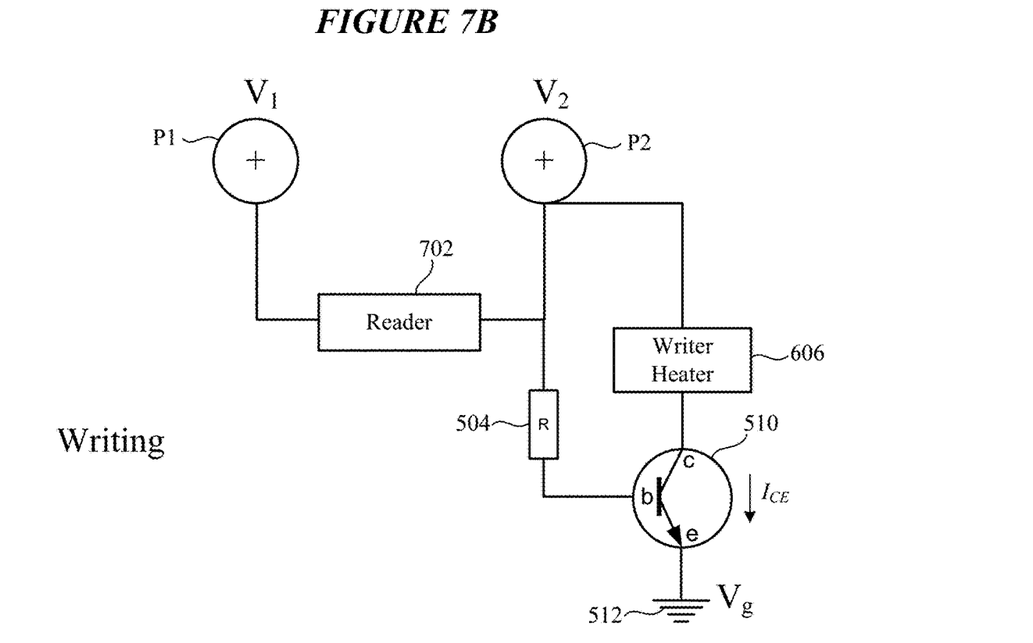

FIGS. 7A and 7B illustrate circuits that support bond pad sharing between a multiplicity of electrical components of a slider in accordance with various embodiments. In particular, FIGS. 7A and 7B illustrate circuitry configured to facilitate bond pad sharing between a reader 702 and a writer heater 606 in accordance with various embodiments. The reader 702 is configured to sense magnetic transitions (e.g., indicative of user data and other information) on a magnetic recording medium. As was discussed previously, the writer heater 606 is typically used to thermally actuate the writer of the slider during write operations, and can also be activated when setting clearance of the slider.

In FIGS. 7A and 7B, two bond pads, P1 and P2 can be biased in a number of ways, such as by alternating the polarity of the voltages supplied to bond pads P1 and P2 or supplying voltages to bond pads P1 and P2 of the same polarity (which may be the same or different in magnitude). In the embodiment shown in FIG. 7A, the reader 702 is coupled between bond pads P1 and P2. FIG. 7A shows the circuitry biased for operation during a read mode. In a read mode, the reader 702 is energized (active) and the writer heater 606 is de-energized (inactive). FIG. 7B shows the circuitry biased for operation during a write mode. In a write mode, the reader 702 is de-energized (inactive) and the writer heater 606 is energized (active).

In the read mode configuration shown in FIG. 7A, the voltage $V_1$ (+) of bond pad P1 is greater than the voltage $V_2$ (−) of shared bond pad P2. It is noted that the voltage $V_2$ of shared bond pad P2 is less than the voltage $V_G$ at the ground pad 512. Given the polarities of the voltages $V_1$ (+) and $V_2$ (−) shown in FIG. 7A, the reader 702 is energized, such that current flows through the reader 702. Because the voltage $V_2$ of shared bond pad P2 is negative, a negative voltage appears at the base (b) of the switching transistor 510, thereby keeping the switching transistor 510 in the OFF state ($I_{CE}$=0). As such, no current flows through the writer heater 606, which is not needed during the read mode, and remains inactive while the reader 702 remains active.

In the write mode configuration shown in FIG. 7B, the voltage $V_1$ (+) of bond pad P1 is equal to the voltage $V_2$ (+) of shared bond pad P2. It is noted that the voltage $V_2$ of shared bond pad P2 is greater than the voltage $V_G$ at the ground pad 512. Because the voltages $V_1$ (+) and $V_2$ (+) shown in FIG. 7B are the same, the reader 702 is de-energized, such that no current flows through the reader 702. Because the voltage $V_2$ of shared bond pad P2 is positive, a positive voltage appears at the base (b) of the switching transistor 510, causing the switching transistor 510 to switch from the OFF state (shown in FIG. 7A) to the ON state. Accordingly, current flows through the writer heater 606, which is needed during the write mode, and remains active while the reader 702 remains inactive.

Figure 8A:
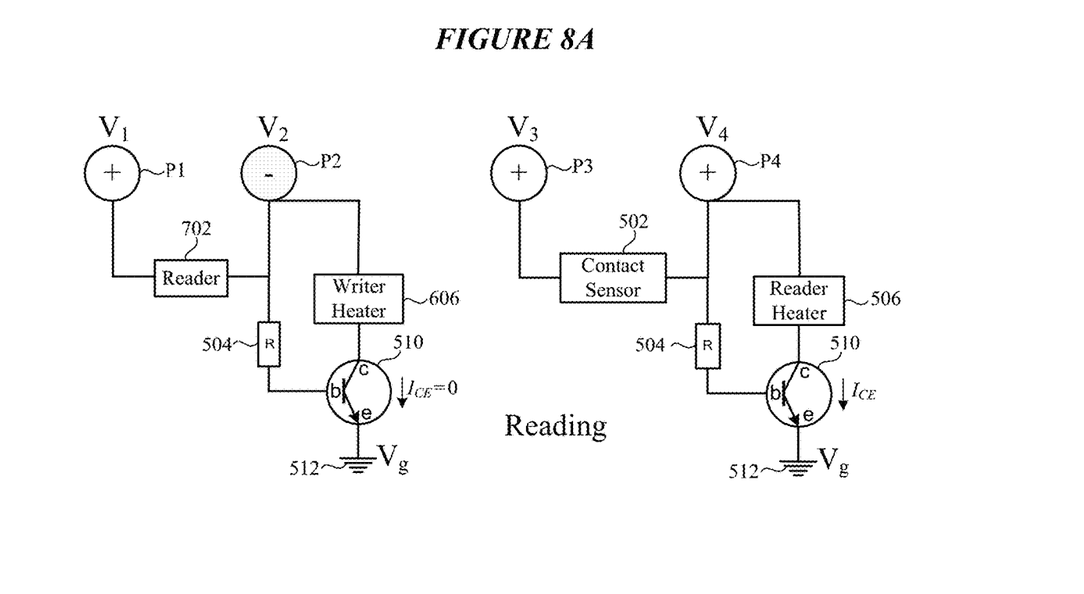
FIGS. 8A and 8B illustrate circuits that support bond pad sharing between a multiplicity of components in accordance with various embodiments.
Figure 8B:
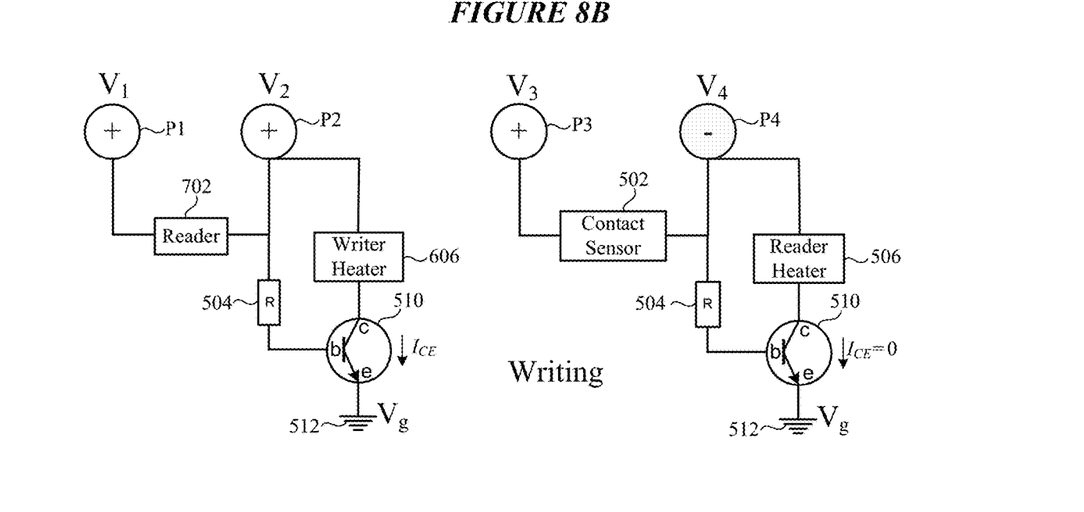

FIGS. 8A and 8B illustrate circuitry configured to facilitate bond pad sharing between a multiplicity of components in accordance with various embodiments. In the embodiment shown in FIG. 8A, the circuits of FIG. 7A and FIG. 5B are configured for concurrent operation during a read mode. In the embodiment shown in FIG. 8B, the circuits of FIG. 7B and FIG. 5A are configured for concurrent operation during a write mode.

During the read mode (FIG. 8A), the reader 702 is active, the writer heater 606 is inactive, the reader heater 506 is active, and the contact sensor 502 can either be active or inactive, as previously discussed. During the write mode (FIG. 8B), the reader 702 is inactive, the writer heater 606 is active, the reader heater 506 is inactive, and the contact sensor 502 can either be active or inactive, as previously discussed. It will be appreciated that other combinations of bond pad sharing circuits comprising different components are contemplated, and that those shown in FIGS. 8A and 8B are for non-limiting illustrative purposes.

Figure 9:
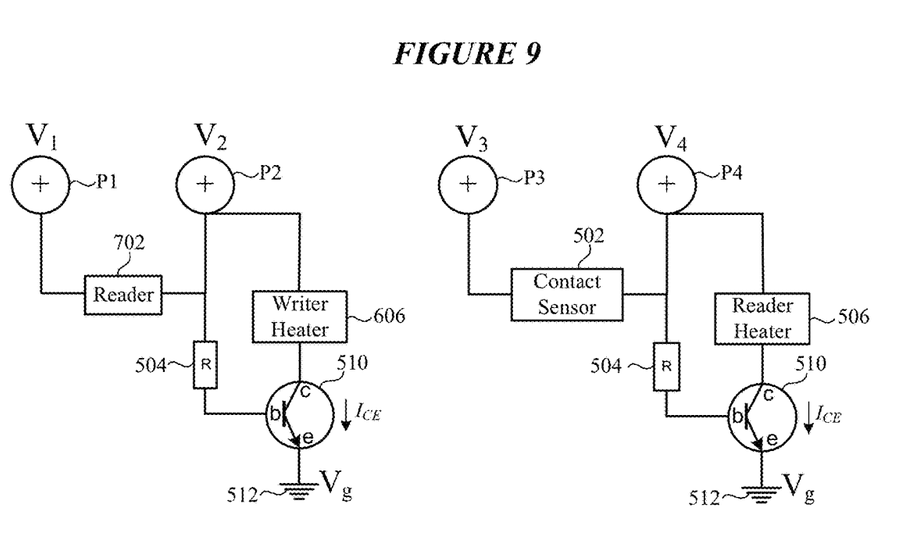
FIG. 9 illustrates circuits that support bond pad sharing between a multiplicity of components in accordance with various embodiments.

FIG. 9 illustrate circuitry configured to facilitate bond pad sharing between a multiplicity of components in accordance with various embodiments. In the embodiment shown in FIG. 9, the circuits of FIG. 7A and FIG. 5B are configured for concurrent operation during a mode in which both the writer heater 606 and the reader heater 506 are simultaneously active. Such a mode can be referred to as a mixed-heater mode. The circuitry and biasing shown in FIG. 9 achieves simultaneous activation of the writer heater 606 and the reader heater 506 while the reader 702 and the contact sensor 502 are inactive.

Figure 10:
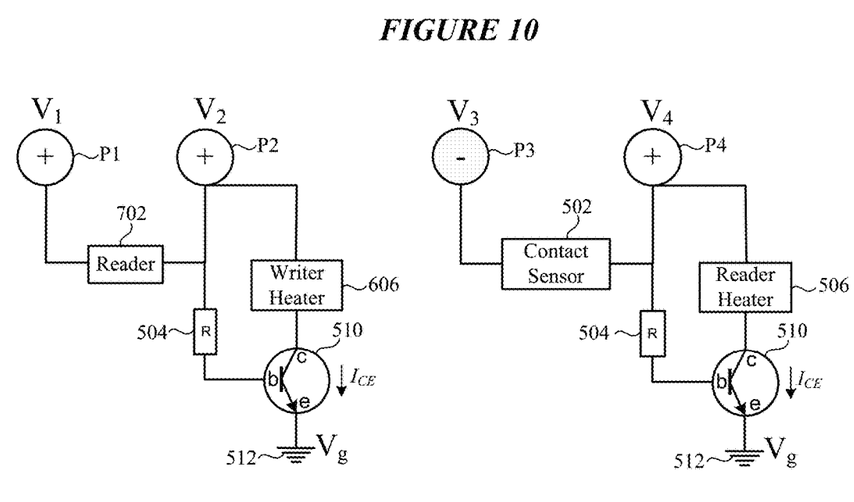
FIG. 10 illustrates circuits that support bond pad sharing between a multiplicity of components in accordance with various embodiments.
Figure 11:
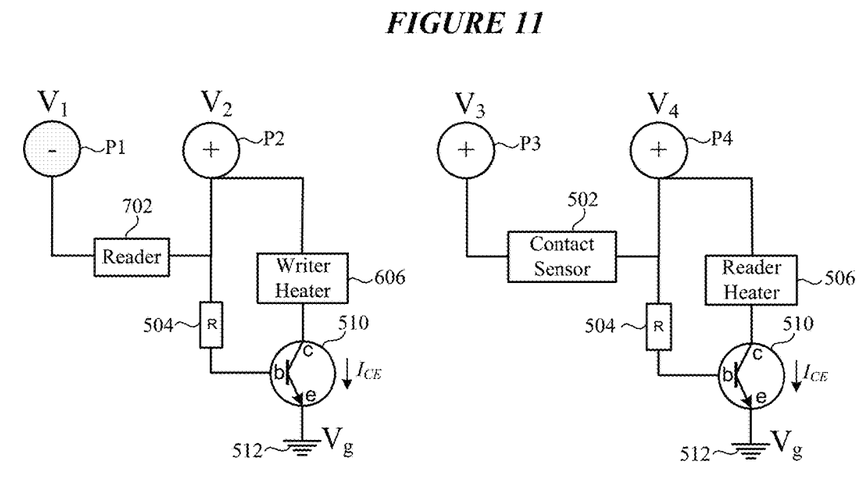
FIG. 11 illustrates circuits that support bond pad sharing between a multiplicity of components in accordance with various embodiments The figures are not necessarily to scale. Like numbers used in the figures refer to like components. However, it will be understood that the use of a number to refer to a component in a given figure is not intended to limit the component in another figure labeled with the same number.

With reference to FIG. 10, it may be desirable to activate both the writer heater 606 and the reader heater 506 along with the contact sensor 502 during a contact-detection mode, such as when setting slider clearance. The polarities of voltages $V_1$-$V_4$ for bond pads P1-P4 shown in FIG. 10 provide this functionality. FIG. 11 illustrates another example of mixed-heater mode operation. FIG. 11 shows an example of mixed-mode heater operation during a read mode, in which both the writer heater 606 and the reader heater 506 are concurrently active along with the reader 702.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
   a slider of a magnetic recording head comprising a plurality of electrical bond pads coupled to bias sources and a ground pad;
   a plurality of electrical components of the slider each coupled one or more of the electrical bond pads, wherein at least one of the electrical bond pads is a shared electrical bond pad coupled to at least a first electrical component and a second electrical component; and
   a switching transistor coupled to the first and second components and the ground pad, the switching transistor arranged to control powering of the second component in response to biasing of the first component.

2. The apparatus of claim 1, wherein the switching transistor is arranged to alternately control powering of the first and second electrical components in response to biasing of the first component.

3. The apparatus of claim 1, wherein the switching transistor is arranged to concurrently power the first and second electrical components.

4. The apparatus of claim 1, wherein:
   the first electrical component is arranged to control switching of the transistor; and
   powering of the second component is dependent on switching of the transistor by the first component.

5. The apparatus of claim 1, wherein the switching transistor is switched between ON and OFF states in response to a change between operating modes of the recording head.

6. The apparatus of claim 5, wherein the operating modes comprise a write mode and a read mode.

7. The apparatus of claim 1, wherein the first electrical component comprises a thermal sensor and the second electrical component comprises a reader heater.

8. The apparatus of claim 1, wherein the first electrical component comprises a thermal sensor and the second electrical component comprises a writer heater.

9. The apparatus of claim 1, wherein the first electrical component comprises a reader and the second electrical component comprises a writer heater.

10. The apparatus of claim 1, wherein at least one other electrical bond pad is a second shared electrical bond pad coupled to at least a third electrical component and a fourth electrical component, and the apparatus further comprises:
    a second switching transistor coupled to the third and fourth components and the ground pad, the second switching transistor arranged to control powering of the fourth component in response to biasing of the third component.

11. The apparatus of claim 1, wherein the recording head is configured for heat-assisted magnetic recording.

12. An apparatus, comprising:
    a slider of a magnetic recording head comprising a plurality of electrical bond pads coupled to bias sources and a ground pad;
    a switching transistor provided at the slider;
    a first electrical component of the slider coupled between a first bond pad and a shared bond pad, the first electrical component coupled to a base of the switching transistor;
    a second electrical component of the slider coupled between the shared bond pad and a collector of the switching transistor; and
    an emitter of the switching transistor coupled to the ground pad.

13. The apparatus of claim 12, wherein the switching transistor is arranged to controllably power the second electrical component in response to biasing of the first electrical component.

14. The apparatus of claim 12, wherein the first and second electrical components are configured to be powered alternately in response to a state of the switching transistor.

15. The apparatus of claim 14, wherein:
    the first electrical component is active and the second electrical component is inactive during a write operation; and
    the second electrical component is active and the first electrical component is inactive during a read operation.

16. The apparatus of claim 12, wherein the first and second electrical components are configured to be powered concurrently in response to a state of the switching transistor.

17. The apparatus of claim 12, wherein the first electrical component comprises a thermal sensor and the second electrical component comprises a reader heater.

18. The apparatus of claim 12, wherein the first electrical component comprises a thermal sensor and the second electrical component comprises a writer heater.

19. The apparatus of claim 12, wherein the first electrical component comprises a reader and the second electrical component comprises a writer heater.

20. The apparatus of claim 12, further comprising:
    a second switching transistor provided at the slider;
    a third electrical component of the slider coupled between a third bond pad and a fourth shared bond pad, the third electrical component coupled to a base of the second switching transistor;

a fourth electrical component of the slider coupled between the fourth shared bond pad and a collector of the second switching transistor; and an emitter of the second switching transistor coupled to the ground pad.

* * * * *